(12) United States Patent
Esser et al.

(10) Patent No.: US 8,915,589 B2
(45) Date of Patent: Dec. 23, 2014

(54) METHOD FOR CALCULATING A SPECTACLE LENS USING VIEWING ANGLE-DEPENDENT PRESCRIPTION DATA

(75) Inventors: Gregor Esser, Munich (DE); Helmut Altheimer, Baisweil-Lauchdorf (DE); Wolfgang Becken, Munich (DE); Andrea Welk, Munich (DE); Dietmar Uttenweiler, Icking (DE)

(73) Assignee: Rodenstock GmbH, Munich (DE)

( * ) Notice: Subject to any disclaimer, the term of this patent is extended or adjusted under 35 U.S.C. 154(b) by 169 days.

(21) Appl. No.: 13/639,602

(22) PCT Filed: Apr. 21, 2011

(86) PCT No.: PCT/EP2011/002055
§ 371 (c)(1),
(2), (4) Date: Oct. 5, 2012

(87) PCT Pub. No.: WO2011/134632
PCT Pub. Date: Nov. 3, 2011

(65) Prior Publication Data
US 2013/0027657 A1   Jan. 31, 2013

(30) Foreign Application Priority Data

Apr. 28, 2010   (DE) .................. 10 2010 018 503
Jan. 26, 2011   (DE) .................. 10 2011 009 473

(51) Int. Cl.
*G06F 19/00*   (2011.01)
*G02C 7/06*   (2006.01)
*G02C 7/02*   (2006.01)

(52) U.S. Cl.
CPC .............. *G02C 7/061* (2013.01); *G02C 7/024* (2013.01); *G02C 7/025* (2013.01); *G02C 7/028* (2013.01); *G02C 2202/22* (2013.01)
USPC ...... 351/159.06; 351/177; 351/246; 351/247; 700/97

(58) Field of Classification Search
CPC .......... G02C 7/028; G02C 7/061; G02C 7/02; G02C 7/024; G02C 7/063; A61B 3/0025; A61F 2/1613; G01M 11/02; G01M 11/0242; G02B 2027/0178
USPC .................. 351/159, 161, 169, 177, 200, 246
See application file for complete search history.

(56) References Cited

U.S. PATENT DOCUMENTS

| | | | |
|---|---|---|---|
| 5,992,998 A | 11/1999 | Pfeiffer et al. | |
| 6,302,540 B1* | 10/2001 | Katzman et al. | 351/159.74 |
| 6,655,803 B1* | 12/2003 | Rubinstein et al. | 351/159.74 |
| 7,249,850 B2 | 7/2007 | Donetti et al. | |
| 7,379,584 B2* | 5/2008 | Rubbert et al. | 382/154 |
| 2001/0056338 A1* | 12/2001 | Qi | 703/6 |
| 2003/0090623 A1* | 5/2003 | Rubinstein et al. | 351/177 |
| 2004/0114100 A1* | 6/2004 | Welk et al. | 351/159 |
| 2004/0263786 A1* | 12/2004 | Williams et al. | 351/246 |
| 2005/0225721 A1* | 10/2005 | Harris et al. | 351/200 |
| 2005/0270482 A1* | 12/2005 | Fisher et al. | 351/177 |
| 2006/0132708 A1* | 6/2006 | Landgrave et al. | 351/176 |
| 2006/0192919 A1* | 8/2006 | Lindacher | 351/161 |
| 2006/0209255 A1 | 9/2006 | Donetti et al. | |
| 2007/0035696 A1* | 2/2007 | Altheimer et al. | 351/169 |
| 2007/0115432 A1* | 5/2007 | Thibos | 351/246 |
| 2007/0132945 A1 | 6/2007 | Haser et al. | |
| 2007/0225950 A1* | 9/2007 | Dursteler Lopez et al. | 703/2 |
| 2008/0239241 A1* | 10/2008 | Yamakaji | 351/246 |
| 2009/0015787 A1* | 1/2009 | Guillen et al. | 351/205 |
| 2009/0125137 A1* | 5/2009 | Allione et al. | 700/97 |
| 2009/0161071 A1* | 6/2009 | Dreher et al. | 351/246 |
| 2009/0168015 A1* | 7/2009 | Wooley et al. | 351/177 |
| 2009/0234336 A1* | 9/2009 | Chernyak et al. | 606/5 |
| 2010/0039614 A1* | 2/2010 | Morris et al. | 351/205 |
| 2010/0145489 A1* | 6/2010 | Esser et al. | 700/97 |
| 2010/0231855 A1* | 9/2010 | Thompson et al. | 351/205 |
| 2011/0153054 A1* | 6/2011 | Hagen et al. | 700/104 |
| 2011/0202286 A1* | 8/2011 | De Rossi et al. | 702/19 |
| 2011/0273664 A1* | 11/2011 | Guilloux et al. | 351/169 |
| 2012/0016644 A1* | 1/2012 | De Rossi et al. | 703/2 |

FOREIGN PATENT DOCUMENTS

| | | | |
|---|---|---|---|
| DE | 10313275 A1 | 10/2004 | |
| EP | 0 677 177 A1 | 10/1995 | |
| JP | 2002-508674 A | 3/2002 | |
| JP | 2007-501960 A | 2/2007 | |
| WO | WO-2008/089999 A1 | 7/2008 | |

OTHER PUBLICATIONS

Thibos, LN. "Propagation of astigmatic wavefronts using power vectors." S Afr Optom 2003 62 (3) 111-113.*

Whatham A., Zimmerman F., Martinez A., Delgado S., Lazon de la Jara P., Sankaridurg P., Ho A. "Influence of accommodation on off-axis refractive errors in myopic eyes". Journal of Vision (2009) 9(3):14, 1-13.*

Harris, William F.; "Power Vectors Versus Power Matrices, and the Mathematical Nature of Dioptric Power"; Optometry and Vision Science, vol. 84, No. 11, Nov. 2007, pp. 1060-1063.

Harris, William, F.; "Dioptric Power: Its Nature and Its Representation in Three- and Four-Dimensional Space"; Optometry and Vision Science, vol. 74, No. 6, Jun. 1997, pp. 349-366.

International Search Report issued for PCT/EP2011/002055, date of mailing Aug. 30, 2011.

Office Action dated Jul. 29, 2014 for Japanese Patent Application No. 2013-506532 (with English translation).

\* cited by examiner

*Primary Examiner* — Suchin Parihar
*Assistant Examiner* — Collin X Beatty
(74) *Attorney, Agent, or Firm* — Schiff Hardin LLP

(57) ABSTRACT

Optimizing a spectacle lens by:
  obtaining prescription or refraction data $V_{A1_1}$ and $V_{A1_2}$ of a wearer for at least two different object distances $A1_1$ and $A1_2$ ($A1_1 \neq A1_2$), comprising data relating to a spherical power $Sph_V$, a magnitude of an astigmatism $Cyl_V$, and an astigmatism axis $Axis_V$;
  specifying an object distance model $A1(x, y)$, wherein $A1$ designates the object distance and $(x, y)$ designates a visual spot or visual point of the spectacle lens in a predetermined direction of sight;
  specifying a function $P_{Ref} = f(A1)$, which describes the dependence of a power vector $$P_{Ref} = \begin{pmatrix} M^{Ref} \\ J_0^{Ref} \\ J_{45}^{Ref} \end{pmatrix}$$

Figure 1:
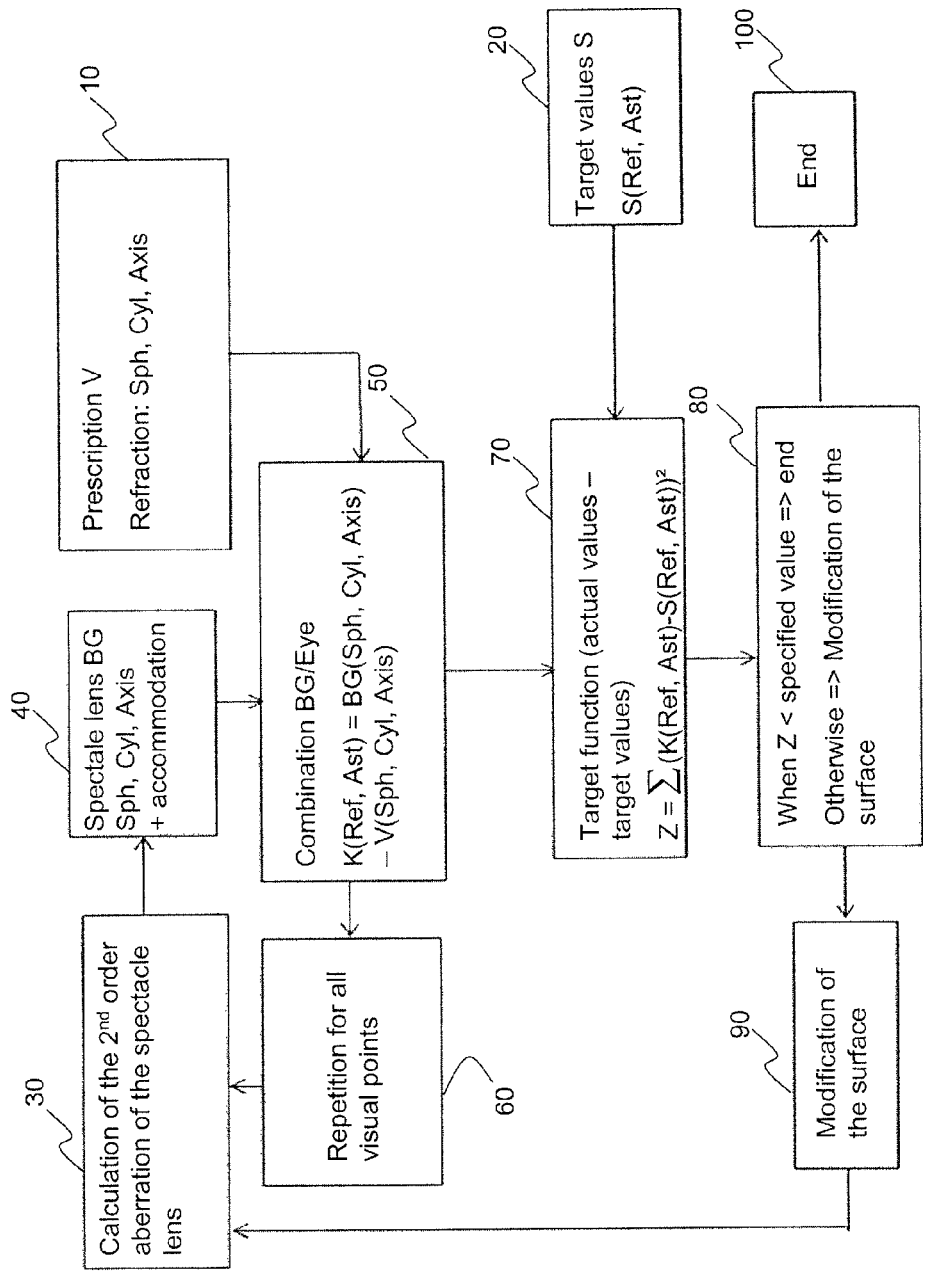

$$= \begin{pmatrix} Sph_V + \dfrac{Cyl_V}{2} \\ -\dfrac{Cyl_V}{2}\cos 2\,Axis_V \\ J_{45}^{Ref} = -\dfrac{Cyl_V}{2}\sin 2\,Axis_V \end{pmatrix}$$

of the prescription on the object distance $A1$,
  determining the components of the power vector $P_{Ref}$ of the prescription in a plurality of visual points $(x, y)$ on the basis of the object distance model $A1(x, y)$ and the obtained prescription data $V_{A1_1}$ and $V_{A1_2}$; and
  calculating at least one surface of the spectacle lens taking the determined components of the power vector $P_{Ref}$ of the prescription in the visual points $(x, y)$ into account.

17 Claims, 10 Drawing Sheets

METHOD FOR CALCULATING A SPECTACLE LENS USING VIEWING ANGLE-DEPENDENT PRESCRIPTION DATA

The invention relates to a method for calculating or optimizing a spectacle lens, to a corresponding production method, as well as to corresponding devices, storage media, and computer program products.

DE 103 13 275 A1 describes a method for calculating an individual spectacle lens. The individual spectacle lens is optimized or calculated by minimizing a target function of the form:

$$\min \sum_i g a_i (A_{actual} - A_{target})_i^2 + g b_i (B_{actual} - B_{target})_i^2 \ldots ,$$

wherein A and B represent the spectacle lens properties to be optimized, such as astigmatism, refractive power, distortion, binocular imbalances, gradients of astigmatism and refractive power, distortions or deformations, etc, and $ga_i$ and $gb_i$ represent weightings of the respective properties. It was found in DE 103 13 275 that it is advantageous to not set the target specifications as absolute values, but as a deviation from the prescription or as permissible errors or aberrations. This is advantageous in so far as the target specifications are independent from the prescription ($Sph_V$, $Cyl_V$, $Axis_V$, $Pr_V$, $B_V$) and the target specifications do not have to be changed for each individual prescription.

EP 0 677 177 describes a spectacle lens and a corresponding optimization method, wherein the total astigmatism of the spectacle lens, which results taking the astigmatism of oblique incidence into account, is almost constant along the principal line or, according to physiological requirements, is variable both with respect to magnitude and cylinder axis. In particular, a change of the cylinder axis of an astigmatic eye upon infraduction can be taken into account according to Listing's law.

Moreover, it is known (cf. e.g. the textbook K. Krause, "Methoden der Refraktionsbestimmung", 1985, pages 158 to 161) that for physiological reasons the individual astigmatism measured for near vision can differ from the individual astigmatism measured for distance vision. It is also known to take account of this difference by a suitable design of the spectacle lens. The European patent application EP 1 660 928 and the parallel U.S. Pat. No. 7,249,850 each describe a method for optimizing a spectacle lens, in which different astigmatic powers in near and distance ranges are taken into account.

It is an object of the invention to provide an improved method for calculating or optimizing a spectacle lens, preferably a progressive spectacle lens, wherein the spectacle lens meets the individual needs of the spectacles wearer in a better way. In particular, it is an object of the invention to provide an improved method for calculating or optimizing a progressive spectacle lens with refraction data for the distance range (prescription data) and refraction data (prescription data) for the near range being given.

According to an aspect of the invention, this object is solved by a computer-implemented method for calculating or optimizing a spectacle lens with the features indicated in claim 1; a device for calculating or optimizing a spectacle lens with the features indicated in claim 12; a computer program product with the features indicated in claim 13, a storage medium with the features indicated in claim 14; a method for producing a spectacle lens with the features indicated in claim 15; a device for producing a spectacle lens with the features indicated in claim 16; and a use of a spectacle lens with the features indicated in claim 17. Preferred embodiments are subject of the dependent claims.

According to an aspect of the invention, a computer-implemented method for calculating or optimizing a spectacle lens is provided, the method comprising the following steps:

obtaining prescription or refraction data $V_{A1_1}$ and $V_{A1_2}$ of a spectacles wearer for at least two different object distances $A1_1$ and $A1_2$ ($A1_1 \neq A1_2$);

specifying an object distance model (object separation-distance model) A1(x, y), wherein A1 designates the object distance and (x, y) designates a visual spot or visual point of the spectacle lens in a predetermined or predeterminable direction of sight;

specifying a model that specifies the dependence of the prescription on the object distance A1, determining the prescription in the visual points (x, y) on the basis of the object distance model A1(x, y) and the obtained prescription or refraction data $V_{A1_1}$ and $V_{A1_2}$, calculating or optimizing at least one surface of the spectacle lens taking the determined prescription in the visual points (x, y) into account.

Here, $V_{A1_1} = V_1$ designates the prescription or refraction data for the first object distance $A1_1$ and $V_{A1_2} = V_2$ designates the prescription or refraction data for the second object distance $A1_2$.

In the refraction determination, the ECP ("eye care practitioner", i.e. optician, optometrist, or ophthalmologist) determines dioptric values (sphere or spherical power (Sph), cylinder or magnitude of the astigmatism/the cylinder (Cyl), cylinder axis or astigmatism axis (Axis or A) for a long, usually infinite, distance. For progressive spectacle lens, an addition (Add) is additionally determined for a second, near distance (e.g. according to DIN 58208). Thus, the prescription data V (Sph, Cyl, A, Add)=($Sph_V$, $Cyl_V$, $Axis_V$, $Add_V$) that are sent to the spectacle lens producer have been determined. Optionally, a prismatic prescription ($Pr_V$, $B_V$) can additionally be determined by the ECP and sent to the spectacle lens producer.

For modern individual spectacle lenses (such as Rodenstock "Impression FreeSign"), the ECP can, in addition to the prescription values, also specify object distances deviating from the norm, which have been used in the refraction determination, and send them to the spectacle lens producer.

The spectacle lens producer calculates or optimizes the spectacle lens taking the obtained prescription data into account. Usually, the spectacle lens is calculated or optimized such that the obtained prescription values $Sph_V$, $Cyl_V$, $Axis_V$, $Add_V$ are accomplished in the reference points (distance and/or near reference point(s)) of the spectacle lens. Here, the prescription or prescription values are specified as a fixed value (or as fixed values) in the optimization process.

In addition to the prescription for the distance range and, optionally, the addition for progressive spectacle lenses, it can be advantageous to take the prescription or the dioptric power necessary to correct a visual defect of the spectacles wearer for more than one object distance, preferably for a far distance (e.g. infinite) and a near distance. For example, the astigmatic power required for correction purposes (cylinder, axis) can vary depending on the viewing angle. A reason for this may be a deformation of the eye lens, the entire eye, or a change of the pupil diameter upon accommodation.

According to one aspect of the invention, it is proposed to not specify the prescription as a fixed value, but as a model of the object distance A1 in the optimization process. The model may be a mathematical model, e.g. in the form of a function, which describes the dependence of the prescription on the object distance. This allows integrating viewing angle or viewing direction-dependent prescription data in the optimization process in a simple and efficient way and results in significantly improved image formation properties of a thus calculated spectacle lens, in particular an individual progressive spectacle lens.

Preferably, the object distance is the reciprocal of the object separation-distance or the separation-distance of the object from the front surface of the spectacle lens in a predetermined direction of sight (measured in D). The coordinate system in which the models are specified and the calculation is performed may be a coordinate system of the front surface, the back surface or any arbitrary suitable coordinate system. For example, the coordinate system may be a coordinate system in the object-side or eye side surface of the spectacle lens to be optimized, wherein the origin of the coordinate e.g. coincides with the geometric center of the (raw-round) spectacle lens or with the centration or fitting point of the spectacle lens. The vertical ("y") and horizontal ("x") axes lie in the tangential plane with respect to the respective eye-side or object-side surface of the spectacle lens in the geometric center or the centration or fitting point. The vertical direction preferably relates to the vertical direction in the wearing position of the spectacle lens, wherein the spectacle lens is for example disposed in an average wearing position (as is defined e.g. in DIN 58 208 part 2) or in an individual wearing position. Preferably, the spectacle lens is disposed in an individual wearing position. Of course, it is possible to indicate all models in other suitable coordinate systems and to subsequently perform all calculations in the selected coordinate system.

An object distance model (object separation-distance model) can be specified by a suitable function $A1(x, y)$, which describes the object distance associated with a visual point $(x, y)$. A standardized object distance model is e.g. indicated in DIN 58 208 part 2 (cf. image 6). However, the object distance model can deviate from this standardized object distance model. Suitable object distance models will be described in detail below.

The prescription can be described by a tuple with the dioptric powers (spherical, astigmatic and/or prismatic power) required for correction purposes. It is also possible to describe the prescription mathematically by a vector, the components of which either corresponding to the individual prescription parameters (sphere, cylinder, axis, etc.) or being specified functions of the individual prescription parameters. The prescription values, or put differently, the magnitude of the required spherical, astigmatic and/or prismatic power, can be determined by means of subjective methods (e.g. by an ECP) or by objective methods (e.g. by an aberrometer) of the refraction determination.

The prescription data can comprise data relating to the required spherical power $Sph_V$, cylinder $Cyl_V$, axis $Axis_V$, prism $Pr_V$ and/or prism base $B_V$ for at least two different object distances $A1_1$ and $A1_2$ ($A1_1 \neq A1_2$). In particular, the prescription data comprises data relating to the required spherical power $Sph_V$, the required magnitude of the astigmatism or of the cylinder $Cyl_V$, and the required cylinder or astigmatism axis or axis $Axis_V$ for at least two different object distances $A1_1$ and $A1_2$ ($A1_1 \neq A1_2$). Thus, it is possible to take account of a deformation of the eye lens or the entire eye and/or a change of the pupil diameter upon accommodation in the calculation or optimization of the spectacle lens.

Additionally or alternatively, it is also possible to take a prismatic power (prism, base) for at least two different object distances $A1_1$ and $A1_2$ into account.

According to a preferred embodiment, the prescription is described by means of a vector $$P_{Ref} = \begin{pmatrix} M^{Ref} \\ J_0^{Ref} \\ J_{45}^{Ref} \end{pmatrix}$$

(hereinafter referred to as power vector of the prescription), wherein:

$$M^{Ref} = Sph_V + \frac{Cyl_V}{2}$$

$$J_0^{Ref} = -\frac{Cyl_V}{2} \cos 2\, Axis_V$$

$$J_{45}^{Ref} = -\frac{Cyl_V}{2} \sin 2\, Axis_V.$$

It holds for the respective object distances $A1_1$ or $A1_2$ for the components of the power vector of the prescription:

$$P_{Ref}(A1_1) = \begin{pmatrix} M^{Ref}(A1_1) \\ J_0^{Ref}(A1_1) \\ J_{45}^{Ref}(A1_1) \end{pmatrix},$$

$$M^{Ref}(A1_1) = Sph_V(A1_1) + \frac{Cyl_V(A1_1)}{2}$$

$$J_0^{Ref}(A1_1) = -\frac{Cyl_V(A1_1)}{2} \cos 2\, Axis_V(A1_1)$$

$$J_{45}^{Ref}(A1_1) = -\frac{Cyl_V(A1_1)}{2} \sin 2\, Axis_V(A1_1),$$

and $$P_{Ref}(A1_2) = \begin{pmatrix} M^{Ref}(A1_2) \\ J_0^{Ref}(A1_2) \\ J_{45}^{Ref}(A1_2) \end{pmatrix},$$

$$M^{Ref}(A1_2) = Sph_V(A1_2) + \frac{Cyl_V(A1_2)}{2}$$

$$J_0^{Ref}(A1_2) = -\frac{Cyl_V(A1_2)}{2} \cos 2\, Axis_V(A1_2)$$

$$J_{45}^{Ref}(A1_2) = -\frac{Cyl_V(A1_2)}{2} \sin 2\, Axis_V(A1_2).$$

In the above formulas, $V_{A1_1} = (Sph_V(A1_1), Cyl_V(A1_1), Axis_V(A1_1))$ designates the obtained prescription data/refraction data for the first object distance $A1_1$; and $V_{A1_2} = (Sph_V(A1_2), Cyl_V(A1_2), Axis_V(A1_2))$ designates the obtained prescription data/refraction data for the second object distance $A1_2$.

The specification of a model, which specifies the dependence of the prescription on the object distance $A1$, then comprises the specification of a function $P_{Ref} = f(A1)$, which describes the dependence of the power vector $P_{Ref}$ or the components of the power vector on the object distance $A1$. Determining the prescription in the visual points $(x, y)$ comprises determining the vector $P_{Ref}(x, y)$ or the components of the power vector $P_{Ref}$ of the prescription on the basis of the object distance model $A1(x, y)$ and the obtained prescription data $V_{A1_1}$ and $V_{A1_2}$.

With the help of the vector $P_{Ref}$ it is possible to vectorially add the prescription values and the values of the spectacle lens in a simple manner (e.g. according to the cross-cylinder method). It is also possible to extend the vector $P_{Ref}$ to the prism $Pr_V$ and the prism base $B_V$:

$$P_{Ref} = \begin{pmatrix} M^{Ref} \\ J_0^{Ref} \\ J_{45}^{Ref} \\ P_0^{Ref} \\ P_{90}^{Ref} \end{pmatrix} mit \begin{matrix} M^{Ref} = Sph_V + \frac{Cyl_V}{2} \\ J_0^{Ref} = -\frac{Cyl_V}{2}\cos 2\,Axis_V \\ J_{45}^{Ref} = -\frac{Cyl_V}{2}\sin 2\,Axis_V \\ P_0^{Ref} = Pr_V \cos B_V \\ P_{90}^{Ref} = Pr_V \sin B_V \end{matrix}$$

A further advantage is an improved account of the physiological properties of the eye and in particular of the astigmatic eye when it looks at different object distances. This applies particularly in the case that the cylinder axis of the prescription astigmatism changes with the object distance or the direction of sight.

The model for the dependence of the prescription on the object distance or for the dependence of the power vector of the prescription on the object distance can be a linear model or a non-linear model. For example, the power vector $P_{Ref}$ of the prescription or its components can be a quadratic function of the object distance A1

$$P_{Ref}(x,y)=f(A1(x,y))=a+b*A1(x,y)^2,$$

or a linear function of the object distance A1

$$P_{Ref}(x,y)=f(A1(x,y))=a+b*A1(x,y)$$

wherein a and b are constants that are calculated as a function of the obtained prescription data $Sph_V$, $Cyl_V$, $Axis_V$ for at least two different object distances $A1_1$ and $A1_2$.

It holds:

$$P_{Ref}(V_{A1_1})=P_{Ref}(V_1,A1=A1_1)=f(A1_1) \text{ and}$$

$$P_{Ref}(V_{A1_2})=P_{Ref}(V_2,A1=A1_2)=f(A1_2).$$

On the basis of the above conditions, it is possible to uniquely determine/define the constants a and b in the above function, and thus $P_{Ref}(x, y)$.

The dependence of the vector $P_{Ref}$ can also be described with the following non-linear model:

$$P_{Ref}(x,y)=f(A1(x,y))=a+b*A1(x,y)+c*A1(x,y)^2$$

and wherein a, b and c are constants that are calculated as a function of the obtained prescription data $Sph_V$, $Cyl_V$, $Axis_V$ for at least three different object distances $A1_1$, $A1_2$ and $A1_3$.

It holds:

$$P_{Ref}(V_{A1_1})=P_{Ref}(V_1,A1=A1_1)=f(A1_1),$$

$$P_{Ref}(V_{A1_2})=P_{Ref}(V_2,A1=A1_2)=f(A1_2) \text{ and}$$

$$P_{Ref}(V_{A1_3})=P_{Ref}(V_3,A1=A1_3)=f(A1_3).$$

On the basis of the above conditions, it is possible to uniquely determine/define the constants a and b and c in the above function, and thus $P_{Ref}(x, y)$.

Preferably, in a two-dimensional vector space, which is spanned by the two components $J^{Ref}_0$ und $J^{Ref}_{45}$ of the power vector $P_{Ref}$, the transition from a first point with coordinates $(J^{Ref}_0(A1_1), J^{Ref}_{45}(A1_1))$ to a second point with coordinates $(J^{Ref}_0(A1_2), J^{Ref}_{45}(A1_2))$ takes place along the shortest connection between the first and second points.

Further preferably, in a three-dimensional vector space, which is spanned by the three components $M^{Ref}$, $J^{Ref}_0$ and $J^{Ref}_{45}$ of the power vector $P_{Ref}$, the transition from a first point with coordinates $(M^{Ref}(A1_1), J^{Ref}_0(A1_1), J^{Ref}_{45}(A1_1))$ to a second point with coordinates $(M^{Ref}(A1_2), J^{Ref}_0(A1_2), J^{Ref}_{45}(A1_2))$ takes place along the shortest connection between the first and second points.

In the above examples, the transition from the distance range to the near range, or generally from the first object distance to the second object distance, takes place along the shortest connection in the two-dimensional vector space, which is spanned by the two components $(J^{Ref}_0, J^{Ref}_{45})$ of the power vector, or particularly preferably in the three-dimensional vector space, which is spanned by the three components $M^{Ref}$, $J^{Ref}_0$ und $J^{Ref}_{45}$ of the power vector $P_{Ref}$. For example, according to a preferred embodiment of the invention, in a Cartesian coordinate system with axes $J^{Ref}_0$ and $J^{Ref}_{45}$, there is a rectilinear transition from a first point with coordinates $(J^{Ref}_0(A1_1), J^{Ref}_{45}(A1_1))$, which correspond to the first object distance $A1_1$, to a second point with coordinates $(J^{Ref}_0(A1_2), J^{Ref}_{45}(A1_2))$, which correspond to the second object distance $A1_2$. The first object distance can be the object distance for the distance range (e.g. infinity) and the second object distance can be the object distance for the near range (e.g. reading distance).

Thereby, it is possible take the physiological properties of the eye and in particular of the astigmatic eye when it looks at different object distances into account in an improved way. The use of power vectors and in particular the above-described transition along the shortest connection further ensures that for any arbitrary intermediate value of the calculated prescription (as a function of the object distance), the sum of the distance (of the calculated value) from the two initial prescriptions (e.g. measured refraction for distance and near ranges) is minimal and constant.

The calculation or optimization of the spectacle lens is usually performed by means of a minimization of a target function Z of the form Z(actual values−target values). Preferably, the calculation or optimization of at least one surface of the spectacle lens comprises a minimization of a target function $$Z = \sum_{i=1}^{N} (K(Ref, Ast) - S(Ref, Ast))_i^2,$$

wherein:
i, i=1 . . . N designates the $i^{th}$ visual point $(x, y)_i$;
K(Ref,Ast) designates the refractive error Ref and the astigmatic error Ast at the $i^{th}$ visual point of the spectacle lens; and
S(Ref,Ast) designates target values for the refractive error Ref and the astigmatic error Ast at the $i^{th}$ visual point of the spectacle lens.

The refractive error represents the difference of the refractive power of the spectacle lens and the refractive power according to the prescription. The astigmatic deviation or astigmatic error represents the difference of the astigmatism of the spectacle lens and the astigmatism according to the prescription. Preferably, these are values in the wearing position, i.e. taking the system spectacle lens-eye into account.

Further, a weighting of the individual errors (i.e. of the refractive error and the astigmatic error) can be taken into account in the target function. In particular, each of the errors can be weighted via the visual point i in a location-dependent way.

Preferably, the method for calculating or optimizing a spectacle lens further comprises a step of specifying an accommodation model for the amplitude of accommodation Akk as a function of the object distance A1. Here, the refractive error and the astigmatic error can be calculated as follows:

$$Ast = -2\sqrt{J^{Dif^2}{}_0 + J^{Dif^2}{}_{45}},$$

$$Ref = M^{Dif}$$

wherein:

$$P_{Dif} = \begin{pmatrix} M^{Dif} \\ J^{Dif}_0 \\ J^{Dif}_{45} \end{pmatrix} = P_{BG+Akk} - P_{Ref},$$

$$P_{BG+Akk} = \begin{pmatrix} M^{BG+Akk} \\ J^{BG+Akk}_0 \\ J^{BG+Akk}_{45} \end{pmatrix},$$

$$M^{BG+Akk} = (Sph_{BG} + Akk) + \frac{Cyl_{BG}}{2}$$

$$J^{BG+AAk}_0 = -\frac{Cyl_{BG}}{2}\cos 2Axis_{BG}$$

$$J^{BG+AAk}_{45} = -\frac{Cyl_{BG}}{2}\sin 2Axis_{BG}$$

and $Sph_{BG}$, $Cyl_{BG}$, $Axis_{BG}$ designate the sphere $Sph_{BG}$, astigmatism $Ast_{BG}$ and astigmatism axis $Axis_{BG}$ of a spectacle lens in the wearing position, respectively. If the prismatic components are given as well, they are preferably independent of the accommodation, like the astigmatic ones.

Here, Akk designates the amplitude of accommodation of the eye at the vertex sphere or the required accommodation of the eye to obtain the desired correction. The vertex sphere is defined as the sphere through the vertex of the back surface of the spectacle lens with the ocular center of rotation as the center point.

The amplitude of accommodation Akk may be a linear function of the object distance.

As explained above, the object distance model can be specified by a suitable function A1(x, y), which describes the object distance associated with a visual point (x, y). A standardized object distance model is e.g. indicated in DIN 58 208 part 2 (cf. image 6). However, the object distance model can deviate from this standardized object distance model.

Usually, the object distance strongly depends on the vertical y coordinate, and less strongly on the horizontal x coordinate.

Preferably, the dependence of the object distance A1(y) on the vertical coordinate y is described by a linear function or by a double asymptote function.

In a linear model, the coefficients of the linear function can be uniquely determined by predetermined conditions for the object distances in the reference points (e.g. distance reference point and near reference point). It is also possible to describe or specify the dependence of the object distance on the y coordinate by a non-linear function, such as a double asymptote function $$A1(y) = b + a - \frac{a}{(1 + e^{c(y+d)})^m}.$$

Here, two of the coefficients, usually the coefficients b and a, can be determined by the predetermined conditions for the object distances in the reference points. The other coefficients of the double asymptote function can be freely specified. These coefficients represent additional degrees of freedom, with which the design of the spectacle lens can be changed.

With regard to the dependence on the horizontal x coordinate, there are degrees of freedom as well. In the simplest case, a model is specified, wherein the object distance is constant (i.e. at y=const.) in the horizontal section.

Alternatively, the dependence of the object distance A1(x) on the horizontal coordinate x can be described by a linear function or by a quadratic function (e.g. a parabolic function) of the distance from the lens center or the principal line. Preferably, in the horizontal section at y=const., the object distance A1(x) decreases in the distance range and increases in the near range as the distance from the lens center or from the principal increases.

The above-described method for calculating or optimizing a spectacle lens can be applied both to single-vision lenses and to progressive spectacle lenses. Preferably, the spectacle lens to be optimized is a progressive spectacle lens. The calculation/optimization of the spectacle lens is preferably performed in the wearing position of the spectacle lens, taking average or individual parameters (face form angle, pantoscopic angle, interpupillary distance, corneal vertex distance, etc.) of the spectacle lens and/or the wearing position of the spectacle lens in front of the wearer's eyes into account.

According to a second aspect, a device for calculating or optimizing a spectacle lens is proposed, which is adapted to perform the computer-implemented method for calculating or optimizing a spectacle lens according to a preferred embodiment of the invention.

The device for calculating or optimizing a spectacle lens comprises prescription data obtaining means adapted to obtain prescription or refraction data $V_{A1_1}$ and $V_{A1_2}$ of a spectacles wearer for at least two different object distances $A1_1$ and $A1_2$ ($A1_1 \neq A1_2$);

object distance model (object separation-distance model) specifying means adapted to specify an object distance model (object separation-distance model) A1(x, y), wherein A1 designates the object distance and (x, y) designates a visual spot or visual point of the spectacle lens in a predetermined or predeterminable direction of sight;

prescription model specifying means adapted to specify a model that describes the dependence of the prescription on the object distance A1, prescription determining means adapted to determine the prescription in the visual points (x, y) on the basis of the object distance model A1(x, y) and the obtained prescription data $V_{A1_1}$ and $V_{A1_2}$, calculating or optimizing means adapted to calculate or optimize at least one surface of the spectacle lens taking the determined prescription in the visual points (x, y) into account.

According to a preferred embodiment of the invention, the device for calculating or optimizing a spectacle lens comprises prescription data obtaining means adapted to obtain prescription or refraction data $V_{A1_1}$ and $V_{A1_2}$ of a spectacles wearer for at least two different object distances $A1_1$ and $A1_2$ ($A1_1 \neq A1_2$), wherein the prescription data comprises data relating to the spherical power $Sph_V$, the magnitude of the astigmatism $Cyl_V$, and the astigmatism axis $Axis_V$ for at least two different object distances $A1_1$ and $A1_2$ ($A1_1 \neq A1_2$);

object distance model (object separation-distance model) specifying means adapted to specify an object distance model (object separation-distance model) $A1(x, y)$, wherein $A1$ designates the object distance and $(x, y)$ designates a visual spot or visual point of the spectacle lens in a predetermined or predeterminable direction of sight;

prescription model specifying means adapted to specify a function $P_{Ref} = f(A1)$, which describes the dependence of a power vector $$P_{Ref} = \begin{pmatrix} M^{Ref} \\ J_0^{Ref} \\ J_{45}^{Ref} \end{pmatrix}$$

of the prescription on the object distance $A1$, wherein $$M^{Ref} = Sph_V + \frac{Cyl_V}{2}$$

$$J_0^{Ref} = -\frac{Cyl_V}{2}\cos 2Axis_V$$

$$J_{45}^{Ref} = -\frac{Cyl_V}{2}\sin 2Axis_V;$$

prescription determining means adapted to determine the components of the power vector $P_{Ref}$ of the prescription in a plurality of visual points $(x, y)$ on the basis of the object distance model $A1(x, y)$ and the obtained prescription data $V_{A1_1}$ and $V_{A1_2}$;

calculating or optimizing means adapted to calculate or optimize at least one surface of the spectacle lens taking the determined components of the power vector $P_{Ref}$ of the prescription in the visual points $(x, y)$ into account.

The second surface of the spectacle lens can be a predetermined or predeterminable surface, for example a simple spherical or rotationally symmetric aspherical surface. It is of course possible to optimize both surfaces of the spectacle lens taking the determined viewing angle or viewing direction-dependent prescription into account.

The optimizing or calculating means and the prescription determining means can be implemented by means of suitably configured or programmed computers, specialized hardware and/or computer networks or computer systems, etc. It is possible for the same computer or the same computer system to be configured or programmed to perform both the calculation or determination of the prescription in the visual points $(x, y)$ and the calculation or optimization of the spectacle lens taking the determined prescription into account. Of course, it is also possible for the calculation or optimization of the spectacle lens to be performed in separate computers or computer systems.

The optimizing or calculating means, prescription determining means, object distance model specifying means, prescription model specifying means, prescription data obtaining means can be in signal communication with corresponding storages by means of suitable interfaces, and in particular read out and/or modify the data stored in the storages. The prescription data obtaining means can further comprise a preferably interactive graphical user interface (GUI), which allows a user to input and/or modify corresponding data. All calculations are preferably performed in real time.

A further aspect of the invention relates to a computer program product and to a storage medium with a computer program stored thereon, wherein the computer program or the computer program product is adapted, when loaded and executed on a computer, to perform the method for calculating or optimizing a spectacle lens.

A further aspect of the invention relates to a method for producing a spectacle lens, comprising:
calculating or optimizing a spectacle lens according to an embodiment of the method for calculating or optimizing a spectacle lens;
manufacturing the thus calculated or optimized spectacle lens.

In particular, the calculation or optimization of the spectacle lens further comprises providing surface data of the spectacle lens calculated or optimized according to an example of the method for calculating or optimizing a spectacle lens. As described above, one of the two surfaces of the spectacle lens (e.g. the front surface) can be a predetermined surface, e.g. a spherical or rotationally symmetric aspherical surface. The other surface (e.g. back surface) is optimized or calculated taking the viewing direction or viewing angle-dependent prescription into account.

According to a further aspect of the invention, a device for producing a spectacle lens is proposed, the device comprising:
calculating or optimizing means adapted to calculate or optimize the spectacle lens according to a preferred embodiment of the method for calculating or optimizing a spectacle lens;
processing means adapted to finish the spectacle lens.

In particular, the device for producing a spectacle lens comprises surface data providing means adapted to provide surface data of the spectacle lens calculated or optimized according to an example of the method for calculating or optimizing a spectacle lens.

The processing means for finishing the spectacle lens can comprise CNC machines for direct machining of a blank according to the determined optimization specifications. Alternatively, the spectacle lens can be manufactured by means of a casting method. Preferably, the finished spectacle lens has a simple spherical or rotationally symmetric aspherical surface and a (e.g. aspherical or progressive) surface optimized on the basis of the design specifications calculated according to the invention and individual parameters of the spectacles wearer. Preferably, the simple spherical or rotationally symmetric aspherical surface is the front surface (i.e. the object-side surface) of the spectacle lens. Of course, it is also possible to arrange the surface optimized on the basis of the calculated design as the front surface of the spectacle lens.

Also, the device for producing a progressive spectacle lens can further comprise obtaining means for obtaining individual data of the spectacles wearer. The obtaining means can particularly comprise graphical user interfaces.

According to a further aspect of the invention, there is proposed a use of a spectacle lens, produced according to the above-described production method, in a spectacles wearer's predetermined average or individual wearing position of the spectacle lens in front of the eyes of a specific spectacles wearer, for correcting a visual defect of the spectacles wearer.

Preferred embodiments of the invention will be described by way of example in the following with reference to the figures.

Figure 2:
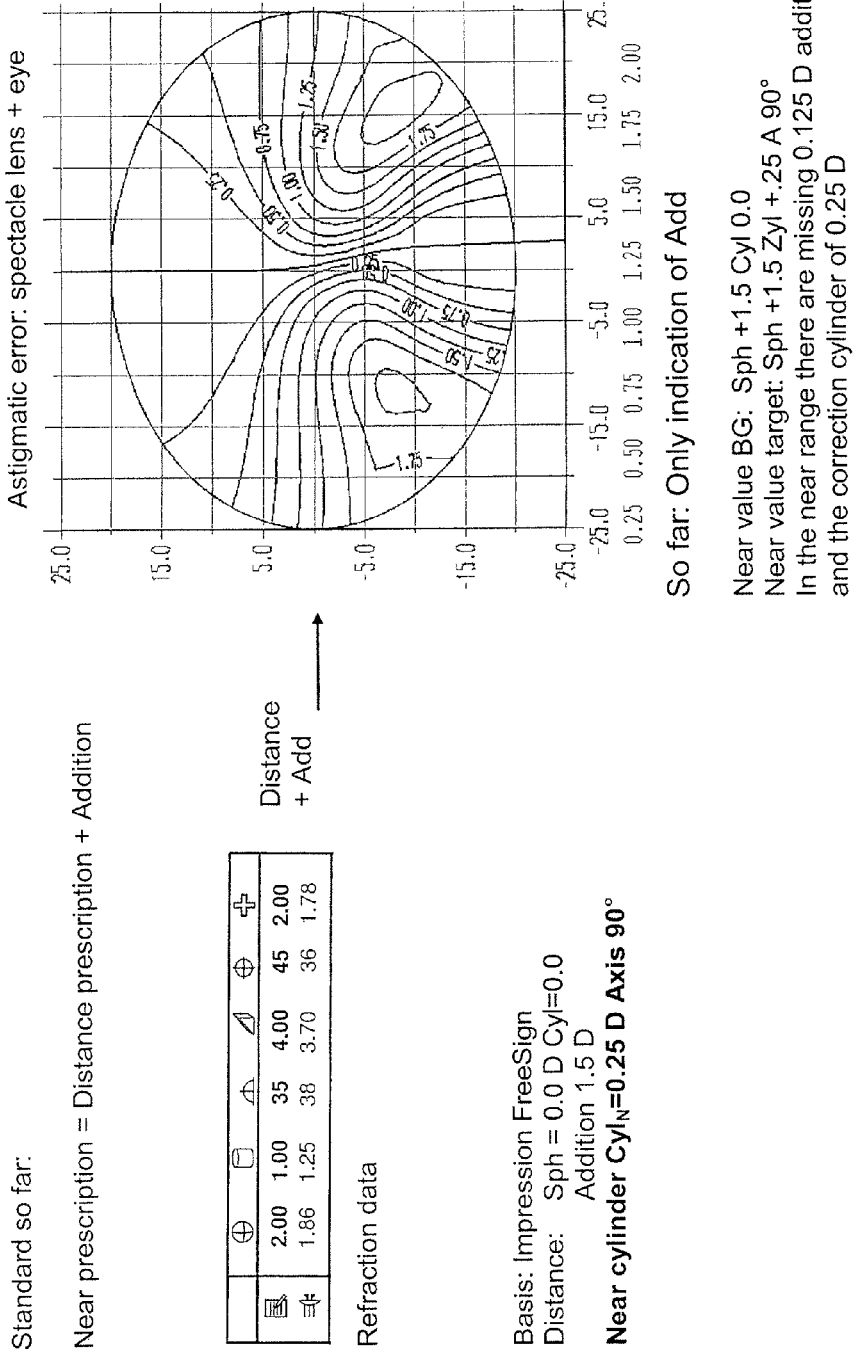
Figure 3:
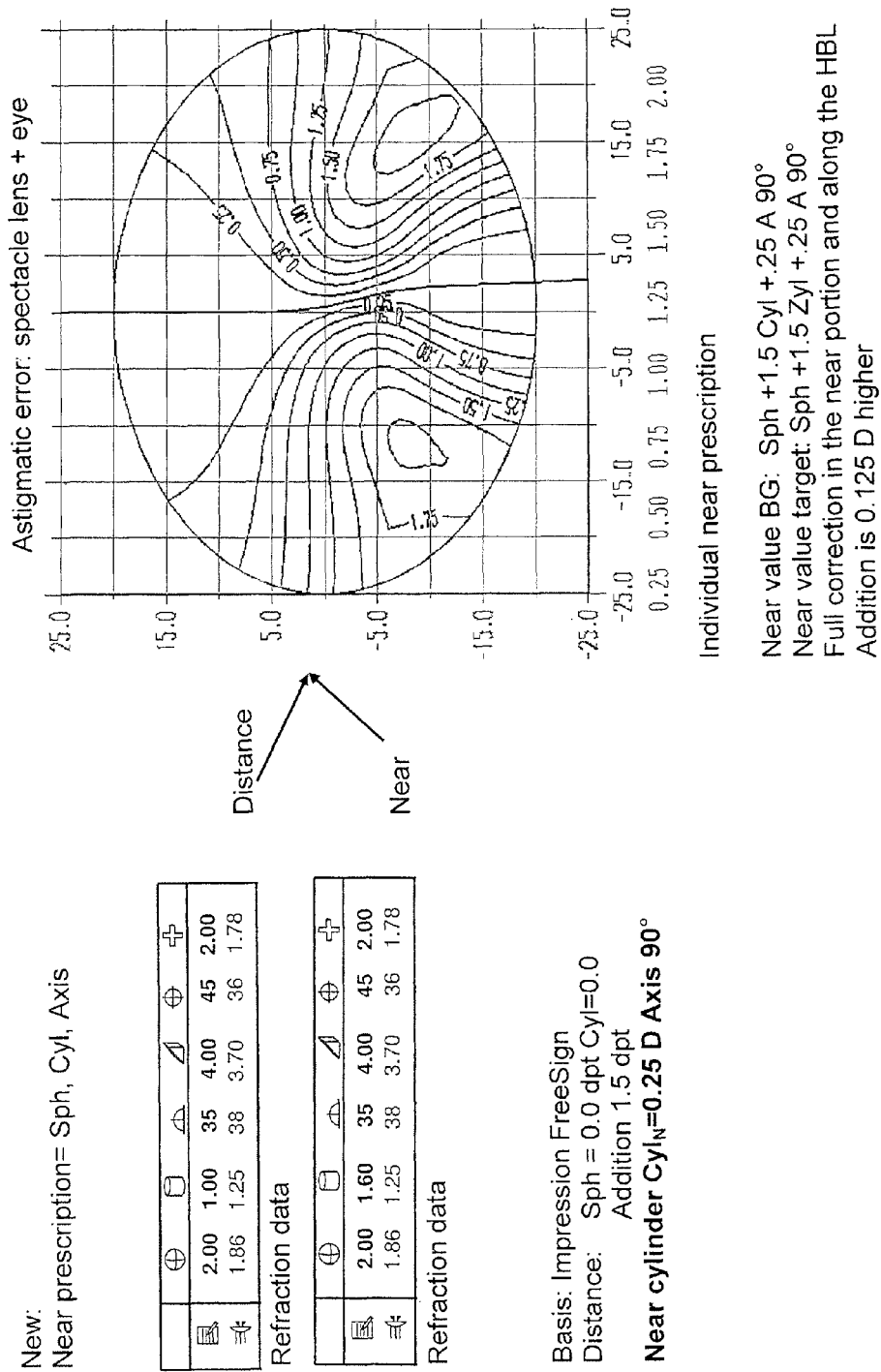
Figure 4:
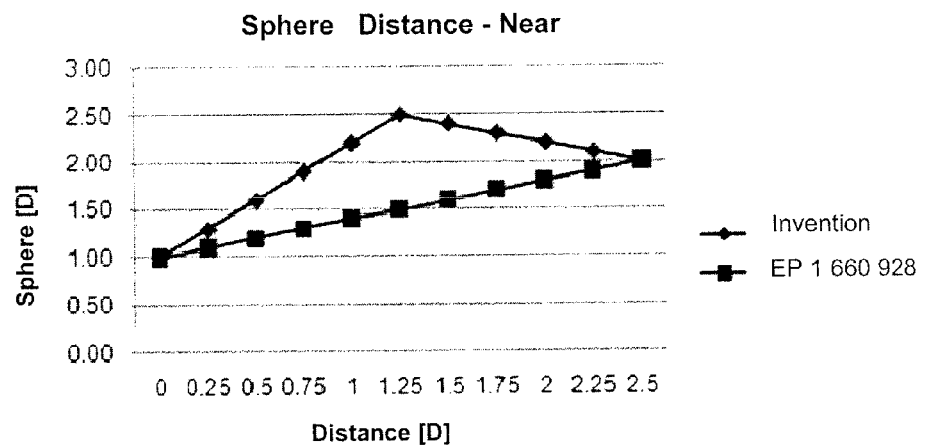
Figure 5:
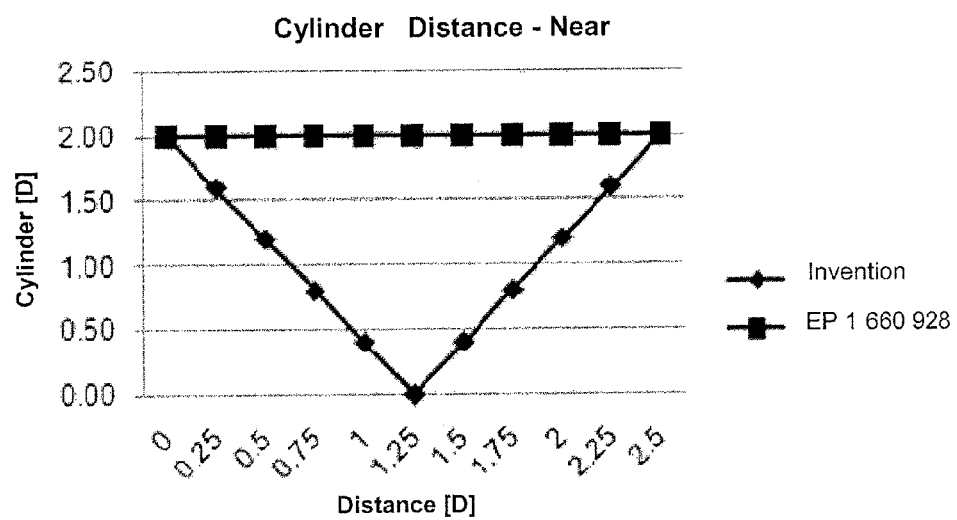
Figure 6:
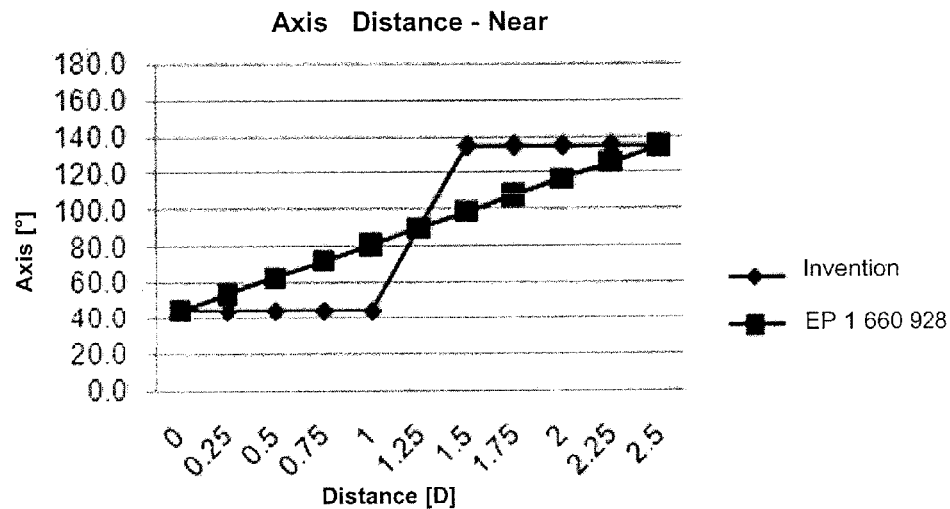
Figure 7:
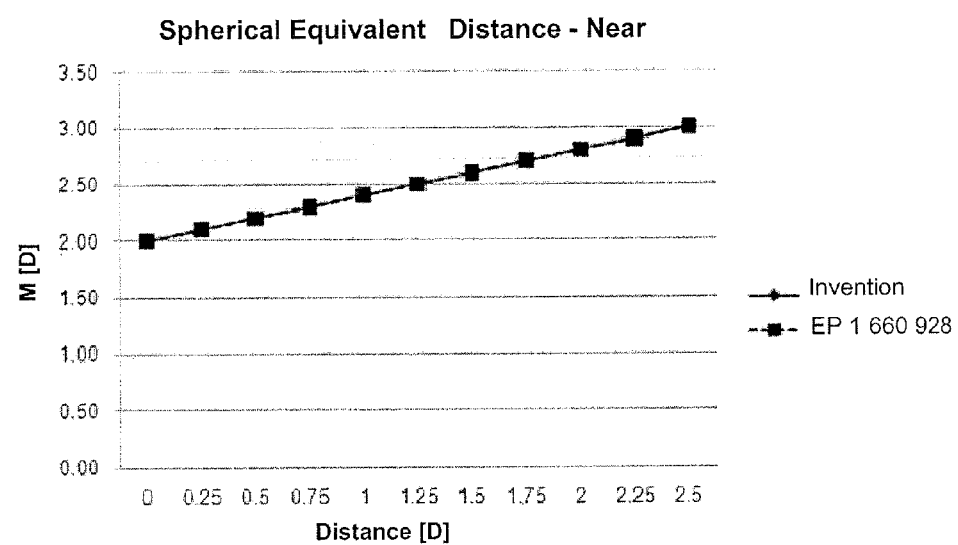
Figure 8:
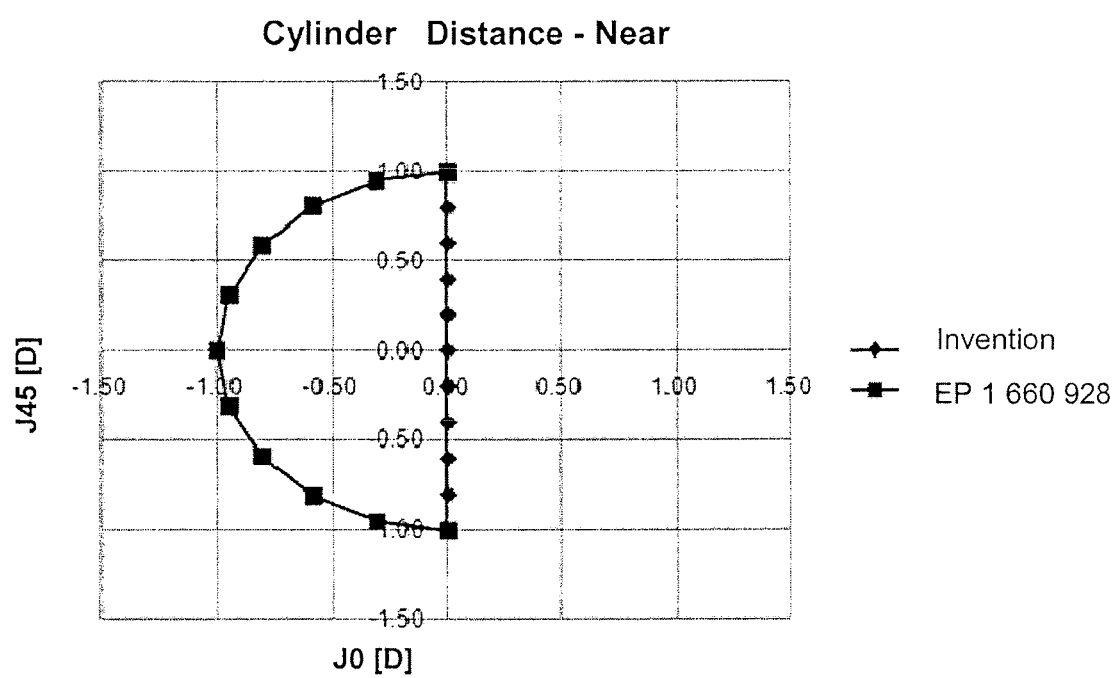
Figure 9:
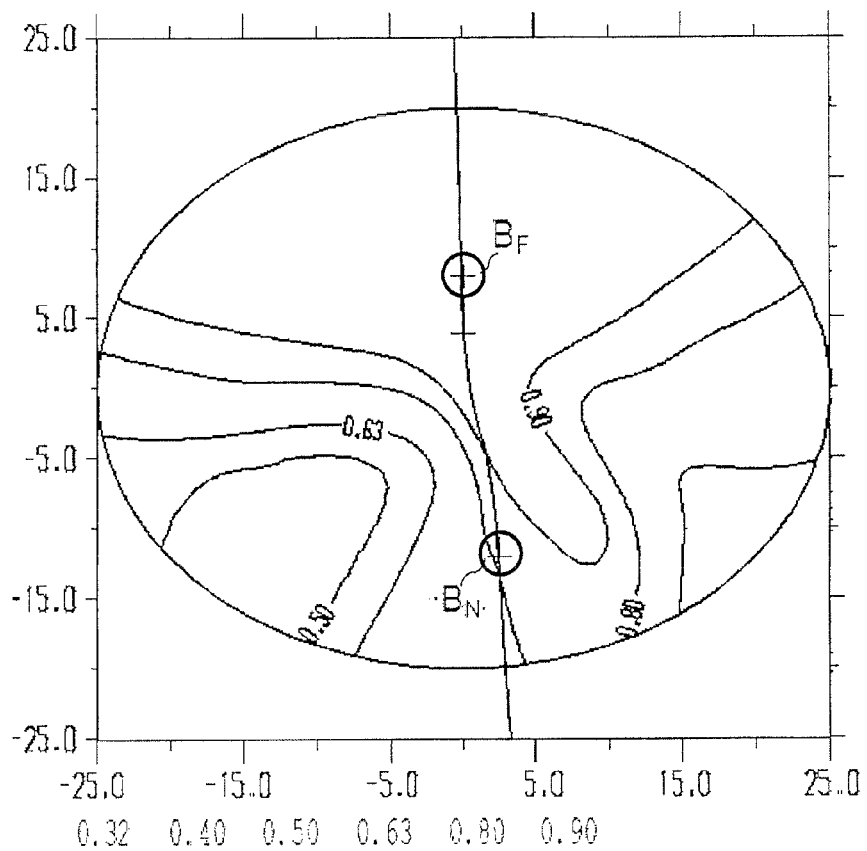
Figure 10:
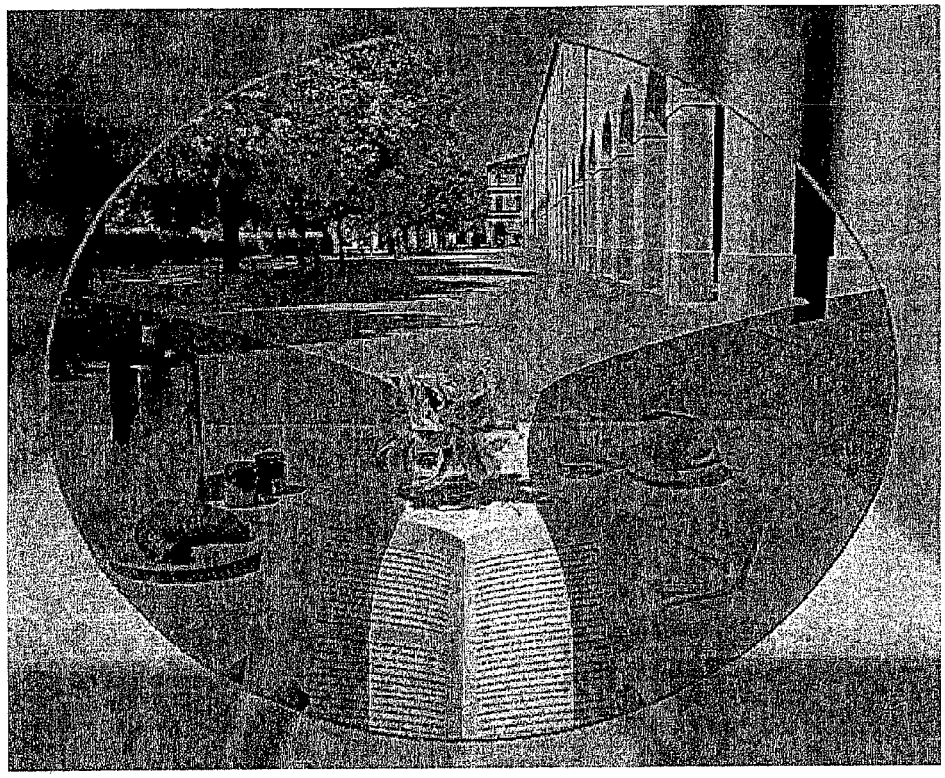
Figure 11:
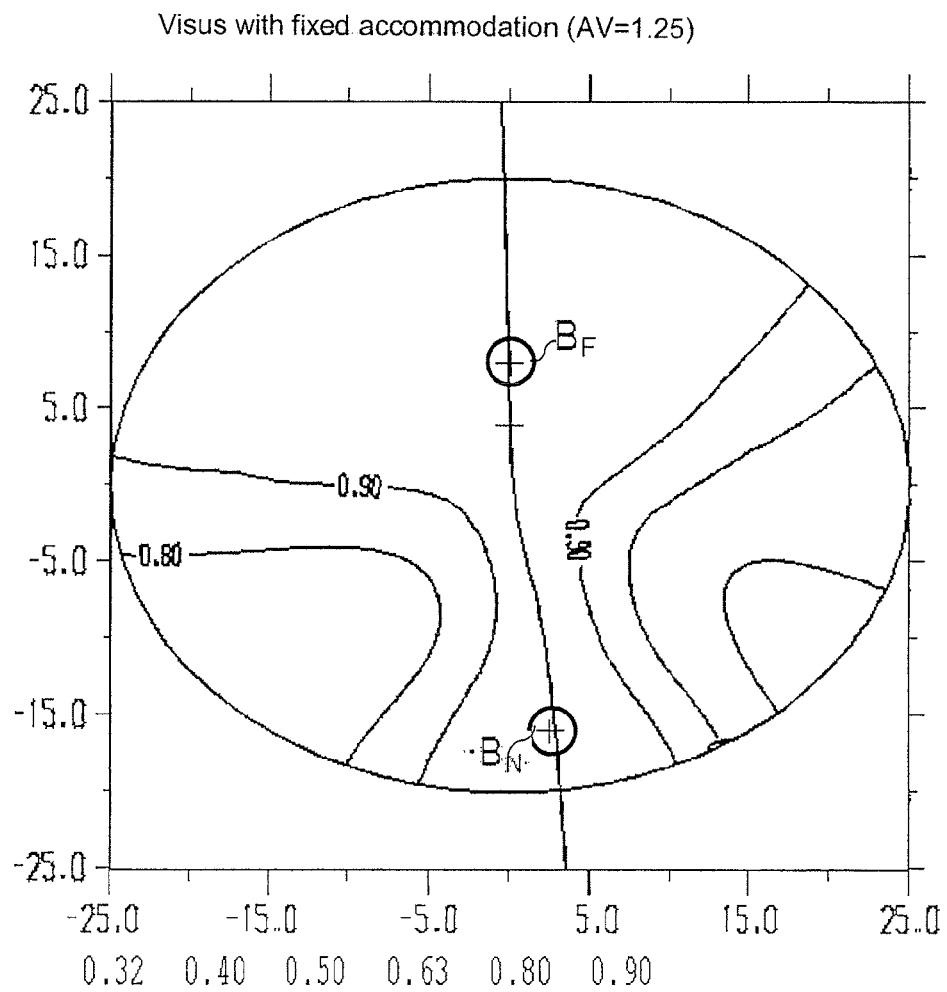
Figure 12:
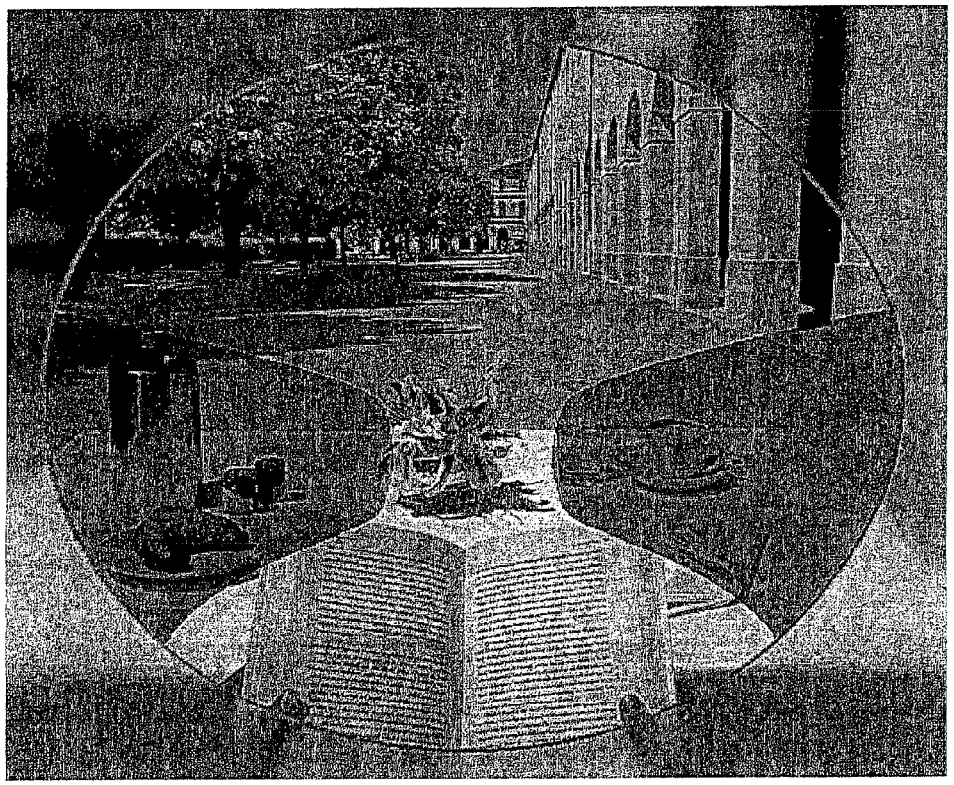

The figures show:

FIG. 1 a flow chart of an exemplary method for optimizing an individual spectacle lens according to an embodiment of the invention;

FIG. 2 an example of a conventionally optimized, individual progressive spectacle lens; and FIG. 3 an example of an individual progressive spectacle lens optimized according to a preferred aspect of the invention;

FIG. 4 spheres according to the prescription as a function of the distance in a comparative example according to the prior art and in an example according to the invention;

FIG. 5 cylinder magnitude according to the prescription as a function of the distance in a comparative example according to the prior art and in an example according to the invention;

FIG. 6 cylinder axis according to the prescription as a function of the distance in a comparative example according to the prior art and in an example according to the invention;

FIG. 7 spherical equivalent (power) according to the prescription as a function of the distance in a comparative example according to the prior art and in an example according to the invention;

FIG. 8 transition of the vector $(J_0, J_{45})$ from refraction 1 to refraction 2 in a comparative example according to the prior art and in an example according to the invention;

FIG. 9 iso lines of the visus in a spectacle lens according to a comparative example, which has been optimized according to a conventional method;

FIG. 10 viewing range illustration of the spectacle lens shown in FIG. 9;

FIG. 11 iso lines of the visus in a spectacle lens that has been optimized according to an exemplary method according to the invention;

FIG. 12 viewing zone illustration of the spectacle lens shown in FIG. 11.

Here, the coordinate system is the above-described coordinate system of the (progressive) back surface to be optimized. In the figures, the distance reference point $B_F$ and the near reference point $B_N$ are each illustrated as circles.

FIG. 1 shows a flow chart of an exemplary method for optimizing an individual progressive spectacle lens according to an embodiment of the invention. The method can analogously be applied to a single-vision lens as well.

From the transmitted prescription data 10 (e.g. V (Sph, Cyl, A, Add)=$(Sph_V, Cyl_V, Axis_V, Add_V)$ and the optionally transmitted object distances or the distances according to DIN (DIN 58208) there is determined a model $Akk=f(A1)$ for the amplitude of accommodation Akk at the vertex sphere as a function of the object distance A1 (reciprocal of the object separation-distance). This is preferably a linear model with $Akk=f(A1)=a+b*A1$.

For example, the ECP has determined a distance prescription $Sph_V=+1.00$ D at an object distance $A1_1=A1_F=0.00$ D (infinite) and an addition $Add_V=2.00$ D at an object distance $A1_2=A1_N=-2.50$ D (40 cm). Then, by definition, the accommodation in the distance range $Akk_F$ at the object distance $A1_F=0.00$ D is also $Akk_F=0.00$ D. The accommodation in the near range $Akk_N$ at the object distance $A1_N=-2.50$ D is $Akk_N=Add-A1_N=0.50$ D. If a linear model with $Akk=f(A1)=a+b*A1$ is specified or set, then the coefficients a and b can be determined in a simple manner. In this case, $a=0.00$ D and $b=-0.2$.

Also, a non-linear model can be specified or set for the amplitude of accommodation as a function of the object distance.

Next, an object distance model (or object distance function) is specified, in which an object distance $A1=f(x, y)$ is determined for each visual point (x, y). Here, it is particularly preferred that the object distance $A1(x_{B_F}, y_{B_F})$ in the distance reference point $B_F$ with coordinates $(x_{B_F}, y_{B_F})$ corresponds to the object distance $A1_F$ in the refraction determination ($A1(x_{B_F}, y_{B_F})=A1_F$) and the object distance $A1(x_{B_N}, y_{B_N})$ in the near reference point $B_N$ with coordinates $(x_{B_N}, y_{B_N})$ corresponds to the object distance $A1_N$ in the refraction determination ($A1(x_{B_N}, y_{B_N})=A1_N$).

Usually, the object distance strongly depends on the vertical y coordinate and less strongly on the horizontal x coordinate. The dependence of the object distance on the y coordinate can be described with a linear model, for example, wherein the coefficients are uniquely determined by the two described conditions for the reference points. It is also possible to specify the dependence of the object distance on the y coordinate by a non-linear function, such as a double asymptote function $$A1(y) = b + a - \frac{a}{(1+e^{c(y+d)})^m}.$$

Here, two coefficients, usually the coefficients b and a, are determined by the two described conditions for the reference points. Degrees of freedom are present with the other coefficients, with which the design of the spectacle lens can be changed.

With respect to the dependence on the x coordinate, there are degrees of freedom as well. In the simplest case, a selection can be made such that the object distance is constant in the horizontal section, or a parable is used and the object distance decreases in the distance range and increases in the near range as the distance from the lens center increases.

For each visual spot (x, y)/visual point (x, y), target values S(Ref,Ast) (target values 20) for the astigmatic error Ast and the refractive error Ref are defined.

For each predetermined or predeterminable visual point (x, y), the second order image formation properties $Sph_{BG}$, $Cyl_{BG}$, $Axis_{BG}$ are calculated taking the object distance $A1(x, y)$ into account in a next step by means of a suitable calculation algorithm, preferably wavefront tracing (step 30).

Due to the defined function for the amplitude of accommodation (i.e. the defined accommodation model), the accommodation $Akk(A1(x, y))$ can be calculated for each object distance $A1(x, y)$ as well. The value of the thus calculated accommodation at the respective visual point (x, y) is added to the calculated second order image formation properties at the visual point (x, y) (step 40):

$$Sph_{BG} \rightarrow Sph_{BG}+Akk$$

The resulting values of the second order image formation properties of the spectacle lens ($Sph_{BG}+Akk$, $Ast_{BG}$, $Axis_{BG}$) now represent the spectacle lens values BG(Sph, Cyl, Axis).

In a next step, the spectacle lens values BG(Sph, Cyl, Axis) are combined with the values of the prescription V (Sph, Cyl, Axis), and the refractive error Ref and the astigmatic error Ast are calculated on the basis of this combination (step 50):

$$K(Ref,Ast)=BG(Sph,Cyl,Axis)-V(Sph,Cyl,Axis).$$

Preferably, to this end, the difference $P_{Dif}=P_{BG+Akk}-P_{Ref}$ is formed with the help of vectors P (referred to as power vectors hereinafter), wherein a power vector P is defined as follows:

$$P = \begin{pmatrix} M \\ J_0 \\ J_{45} \end{pmatrix}, \quad \begin{aligned} M &= sph + \frac{cyl}{2} \\ J_0 &= -\frac{cyl}{2}\cos 2\text{Axis} \\ J_{45} &= -\frac{cyl}{2}\sin 2\text{Axis}. \end{aligned}$$

Thus, it holds:

$$P_{BG+Akk} = \begin{pmatrix} M^{BG+Akk} \\ J_0^{BG+Akk} \\ J_{45}^{BG+Akk} \end{pmatrix}, \text{ wherein}$$

$$M^{BG+Akk} = (Sph_{BG} + Akk) + \frac{Cyl_{BG}}{2}$$

$$J_0^{BG+Akk} = -\frac{Cyl_{BG}}{2}\cos 2Axis_{BG}$$

$$J_{45}^{BG+Akk} = -\frac{Cyl_{BG}}{2}\sin 2Axis_{BG}$$

and $$P_{Ref} = \begin{pmatrix} M^{Ref} \\ J_0^{Ref} \\ J_{45}^{Ref} \end{pmatrix}, \text{ wherein}$$

$$M^{Ref} = Sph_V + \frac{Cyl_V}{2}$$

$$J_0^{Ref} = -\frac{Cyl_V}{2}\cos 2Axis_V$$

$$J_{45}^{Ref} = -\frac{Cyl_V}{2}\sin 2Axis_V.$$

With the help of the power vectors P, it is possible to add the prescription values and the spectacle lens values vectorially (e.g. according to the cross-cylinder method).

From the components of the power vector $P_{Dif}$, $$P_{Dif} = \begin{pmatrix} M^{Dif} \\ J_0^{Dif} \\ J_{45}^{Dif} \end{pmatrix},$$

the astigmatic error Ast and the refractive error Ref can be calculated as follows:

$$Ast = -2\sqrt{J_0^2 + J_{45}^2} = -2\sqrt{J^{Dif^2}_0 + J^{Dif^2}_{45}}.$$

$$Ref = M = M^{Dif}$$

The calculation of the refractive error Ref and the astigmatic error Ast is repeated for all visual points (x, y) (for all visual spots (x, y)) (step 60).

In a next step (step 70), a target function Z(target values−target values) is calculated, in which the values of the previously determined refractive error Ref and the astigmatic error Ast and the target values for the refractive error Ref and the astigmatic error Ast are taken into account. To this end, for all visual spots/visual points, the deviation of the previously determined refractive error Ref and the deviation of the previously determined astigmatic error Ast from the corresponding target values S(Ref,Ast) are calculated.

In an exemplary target function, the squares of the differences can be added to an error sum of squares:

$$Z = \sum_{i=1}^{N} (K(Ref, Ast) - S(Ref, Ast))_i^2,$$

wherein:

K(Ref,Ast) designates the refractive error and the astigmatic error of the spectacle lens; and
S(Ref,Ast) designates target values for the refractive error and the astigmatic error; and
i, i=1 . . . N designates the i$^{th}$ visual point.

In a next step (step 80), the target function Z is evaluated. If the error sum of squares is below a fixed threshold, the optimization is terminated (step 100). Otherwise, the surface of the spectacle lens is modified with a suitable optimization algorithm (step 90) and the tracing is restarted (put differently, steps 30 to 80 are performed again).

As described above, there may be the case that it is not sufficient to only determine one addition, but that it is required to also fully determine the sphere, cylinder, and axis $Sph_V$, $Zyl_V$, $Axis_V$ for the near range. A reason for this may be a deformation of the eye lens, the entire eye, or a change of the pupil diameter upon accommodation. According to an aspect of the invention, it is therefore proposed to not specify the prescription as a fixed value, but as a function of the object distance A1 in the optimization process.

If a prescription in the distance range is $Sph_{V_1}$=+1.00 D, $Cyl_{V_1}$=1.00 D, $Axis_{V_1}$ 10° at an object distance $A1_1$=$A1_F$=0.00 D and a prescription in the near range is $Sph_{V_2}$=+3.00 D, $Cyl_{V_2}$=0.50 D, $Axis_{V_2}$=0° at an object distance $A1_2$=$A1_N$=−2.50 D, then two power vectors $P_{V1}$=$P_{distance}$ und $P_{V2}$=$P_{near}$ can be formed therefrom.

In order to take the different prescriptions into account, a model of the power vector $P_{Ref}$ can be formed (or defined or specified) as a function of the object distance A1, preferably a linear model:

$$P_{Ref}=f(A1)=a+b*A1.$$

Here, the coefficient vectors a and b of the prescriptions for distance and near ranges can be easily determined. In this case, $P_{distance}$=(1.50; 0.47; 0.17)$^T$*D and $P_{near}$=(3.25; 0.25; 0.00)$^T$*D, a=$P_{distance}$ und b=(−0.7; −0.1; −0.068)$^T$.

The addition can also be calculated separately. If the addition Add$_V$ is 2.00 D in this example, then $P_{near}$=(1.25; 0.25; 0.00)$^T$*D.

However, it is possible to describe the dependence of the prescription or the power vector $P_{Ref}$ on the object distance A1 by a non-linear model. Generally, $P_{Ref}$=f(A1) holds.

With the above-described method, a prescription can be calculated for any object distance and direction of sight. The progressive spectacle lens is than optimized taking the viewing direction-dependent prescription into account.

FIG. 2 shows the distribution of the astigmatism in the wearing position of an individual progressive spectacle lens, which has been optimized taking fixed prescription values $Sph_V$, $Ast_V$, $Axis_V$, $Add_V$ into account. The refraction or prescription data, which have been sent to the spectacle lens manufacturer and have been taken into account in the optimization of the spectacle lens, are sphere $Sph_V$=0.0 D, cylinder $Cyl_V$=0.0 D, and cylinder axis $Axis_V$=0° for the distance range, and an addition Add$_V$=1.5 D. The thus calculated spectacle lens has values of $Sph_{BG}=+1.5$ D, $Cyl_{BG}=0.0$ D, $Axis_{BG}=0°$ in the near reference point.

However, a more precise refraction determination shows that the spectacles wearer also needs a near cylinder $Cyl_{V_{near}}$ of 0.25 D with a cylinder axis $Axis_{V_{near}}=90°$. In this conventionally optimized spectacle lens, wherein in addition to the refraction or prescription values for the distance range only the addition is taken into account, 0.125 D addition and a correction cylinder of 0.25 D are missing in the near range.

FIG. 3 shows the distribution of the astigmatism in the wearing position of an individual progressive spectacle lens, which has been optimized using the method described with respect to FIG. 1, taking viewing direction-dependent prescription values into account. The refraction or prescription data for the distance range, which have been taken into account in the optimization of the spectacle lens, correspond to the refraction or prescription data of the example shown in FIG. 1, i.e. sphere $Sph_{V_1}=Sph_{V_{distance}}=0.0$ D, cylinder $Cyl_{V_1}=Cyl_{V_{distance}}=0.0$ D, and cylinder axis $Axis_{V_1}=Axis_{V_{distance}}=0°$ for the distance range (at an object distance $A1_F$ in the refraction determination in the distance range of 0.0 D, i.e. infinite). The prescribed addition $Add_V$ is also 1.5 D.

In addition, the near cylinder $Cyl_{V_2}=Cyl_{V_{near}}$ of 0.25 D with a cylinder axis $Axis_{V_2}=Axis_{V_{near}}=90°$ determined by the refraction determination has been taken into account in the optimization of the spectacle lens. The thus optimized spectacle lens has values of $Sph_{BG}=+1.5$ D, $Cyl_{BG}=+0.25$ D, $A_{BG}=90°$ in the near reference point. These values correspond to the values for the near range determined by refraction determination. A fullcorrection is achieved in the near portion and along the principal line of sight HBL. The addition of this spectacle lens is 0.125 D higher than the addition of the spectacle lens shown in FIG. 2.

As explained above, the prescription (described by a power vector) is determined in a plurality of visual points (x, y) on the basis of the obtained prescription values for distance and near ranges and the specified model for the prescription as a function of the object distance. Thus, the prescription is a function of the direction of sight.

FIGS. 4 to 8 show the dependence of the different components of the prescription (sphere, cylinder, axis, etc.) on the object distance in a comparative example according to the prior and according to an embodiment of the invention. In particular, FIGS. 4 to 8 show the transition between distance and near ranges:

of the spherical power according to the prescription (FIG. 4);
the magnitude of the astigmatism (or cylinder) according to the prescription (FIG. 5);
the cylinder axis according to the prescription (FIG. 6),
the spherical equivalent M (FIG. 7); and
the cylindrical power (J0,J45) (FIG. 8).

In the comparative example, the magnitude and the cylinder axis of the astigmatism according to the prescription are separately specified and modeled as a function of the infraduction, as is described e.g. in EP 1 660 928/U.S. Pat. No. 7,249,850. Thus, there is a separate transition from the distance range to the near range both for the magnitude and for the cylinder axis of the astigmatism/cylinder, each as a function of the infraduction or the viewing angle. The prescription values sphere (Sph), cylinder (Cyl), and axis follow the shortest connections between distance and near ranges and are therefore illustrated by straight lines in the respective drawings (cf. FIGS. 4 to 6).

However, it has turned out that it is advantageous that the addition and subtraction are not performed by means of the components sphere (Sph), cylinder (Cyl), and axis, but by means of power vectors $$P = \begin{pmatrix} M \\ J_0 \\ J_{45} \end{pmatrix}$$

with components $$M = sph + \frac{cyl}{2}, \; J_0 = -\frac{cyl}{2}\cos 2A \; und \; J_{45} = -\frac{cyl}{2}\sin 2A.$$

According to a preferred embodiment of the invention, the transition from the distance range to the near range always takes place along the shortest connection in the two-dimensional vector space, which is spanned by the two components ($J_0$, $J_{45}$), or particularly preferably in the three-dimensional vector space, which is spanned by the three components (M, $J_0$, $J_{45}$) of the power vector $$P = \begin{pmatrix} M \\ J_0 \\ J_{45} \end{pmatrix}.$$

FIG. 8 shows the transition of the vector ($J^{Ref}_0$, $J^{Ref}_{45}$) from refraction 1 (the refraction at a first object distance $A1_1$, e.g. in the distance range) to refraction 2 (the refraction at a second object distance $A1_2$, e.g. in the near range). In FIG. 8, the points P1 and P2 are each points with coordinates:

$P1=P1(J^{Ref}_0(A1_1),J^{Ref}_{45}(A1_1))$; and $P2=P2(J^{Ref}_0(A1_2),J^{Ref}_{45}(A1_2))$ According to the preferred embodiment of the invention, the transition is always rectilinear here. The transition from the distance range to the near range in the comparative example, however, is not rectilinear and does not follow the shortest connection between the distance range and the near range.

If only the magnitude of the astigmatism is to change upon looking from the distance range to the near range, whereas the cylinder axis remains constant, the method (comparative example) known from EP 1 660 928/U.S. Pat. No. 7,249,850 and the method according to the embodiment of the invention furnish the same results. However, if also the change of the cylinder axis of the astigmatism is to be taken into account, there are significant differences between the two models in part.

The biggest differences between the models for the prescription astigmatism as a function of the object distance or the direction of sight/viewing angle according to EP 1 660 928/U.S. Pat. No. 7,249,850 and according to the embodiment of the invention result when the magnitude of the astigmatism remains constant and merely the cylinder axis changes. This can be illustrated by the following example:

The determined prescription values/refraction values for the distance and near ranges are:
distance: Cyl=2 D; Axis=45°
near: Cyl=2 D; Axis=135°.

With an object distance of 1.25 D, there result the values Cyl=2 D; axis=90° for the prescription according to the model known from EP 1 660 928/U.S. Pat. No. 7,249,850. According to the method of a preferred embodiment of the invention, the value Cyl=0 D results with an object distance of 1.25 D.

FIG. 9 and FIG. 10 each show the iso lines of the visus and the corresponding viewing zone illustration for a spectacle lens according to a comparative example, which has been optimized by means of a conventional method taking the astigmatic prescription values for the distance range into account. In this case, the determined refraction values for the distance and near ranges are:
distance: Sph=0.00 D; Cyl=3.50 D; Axis=10°
near: Sph=1.25 D; Cyl=3.75 D; Axis=16°.

The corresponding ordered values for the spectacle lens only take the astigmatism for the distance range into account and correspondingly read:
distance: Sph=0.00 D; Cyl=3.50 D, and Axis=10°
Add=1.50 D.

The "as worn" powers of a spectacle lens optimized according to a conventional method taking the astigmatic prescription values for the distance range into account are:
distance: Sph=0.00 D; Cyl=3.50 D; Axis=10°
near: Sph=1.50 D; Cyl=3.50 D; Axis=10°.

FIG. 11 and FIG. 12 each show the iso lines of the visus and the corresponding viewing zone illustration for a spectacle lens according to an embodiment of the invention. The spectacle lens is optimized taking the astigmatic prescription values for the distance and near ranges into account. In this embodiment, the determined refraction values for the distance and near ranges are the same as in the comparative example shown in FIGS. 9 and 10:
distance: Sph=0.00 D; Cyl=3.50 D; Axis=10°
near: Sph=1.25 D; Cyl=3.75 D; Axis=16°.

The corresponding ordered values for the spectacle lens take both the astigmatism for the distance range and the astigmatism for the near range into account, which has been determined using the refraction determination:
distance: Sph=0.00 D; Cyl=3.50 D; Axis=10°
near: Sph=1.25 D; Cyl=3.75 D; Axis=16°.

The "as worn" powers of a spectacle lens optimized according to a preferred method of the invention taking the astigmatic prescription values for the distance and near ranges into account are:
distance: Sph=0.00 D; Cyl=3.50 D; Axis=10°
near: Sph=1.25 D; Cyl=3.75 D; Axis=16°.

A comparison of FIGS. 9 and 10 with FIGS. 11 and 12 shows a clear improvement of the visus in the near zone of the spectacle lens, which has been optimized according to the method of the embodiment of the invention.

LIST OF REFERENCE NUMERALS $Sph_V$, $Cyl_V$, $Axis_V$, $Add_V$, $Pr_V$, $B_V$ prescription data (sphere, cylinder, axis, addition, prism, base)
$Sph_{BG}$, $Cyl_{BG}$, $Axis_{BG}$ (corrected) second order image formation properties of the spectacle lens
A1 object distance
$A1_F$ object distance in the distance range
$A1_N$ object distance in the near range
Akk accommodation
$Akk_F$ accommodation in the distance range
$Akk_N$ accommodation in the near range
(x, y) visual spot or visual point in a predetermined or predeterminable direction of sight
$(x_{B_F}, y_{B_F})$ coordinates of the distance reference point $B_F$
$(x_{B_N}, y_{B_N})$ coordinates of the near reference point $B_N$
Ref refractive error
Ast astigmatic error
S(Ref,Ast) target values for the astigmatic error and the refractive error

The invention claimed is:

1. A method for calculating or optimizing and manufacturing a spectacle lens, comprising:
obtaining prescription or refraction data $V_{A1_1}$ and $V_{A1_2}$ of a spectacles wearer for at least two different object distances $A1_1$ and $A1_2$, wherein $A1_1$ does not equal $A1_2$, and the prescription data comprises data relating to a spherical power $Sph_V$, a magnitude of an astigmatism $Cyl_V$, and an astigmatism axis $Axis_V$ for the at least two different object distances $A1_1$ and $A1_2$;
specifying an object distance model A1(x, y), wherein A1 designates the object distance and (x, y) designates a visual spot or visual point of the spectacle lens in a predetermined or predeterminable direction of sight;
specifying a function $P_{Ref}=f(A1)$, which describes the dependence of a power vector $$P_{Ref} = \begin{pmatrix} M^{Ref} \\ J_0^{Ref} \\ J_{45}^{Ref} \end{pmatrix}$$

of the prescription on the object distance A1, wherein $$M^{Ref} = Sph_V + \frac{Cyl_V}{2}$$

$$J_0^{Ref} = -\frac{Cyl_V}{2}\cos 2Axis_V$$

$$J_{45}^{Ref} = -\frac{Cyl_V}{2}\sin 2Axis_V;$$

determining the components of the power vector $P_{Ref}$ of the prescription in a plurality of visual points (x, y) on the basis of the object distance model A1(x, y) and the obtained prescription data $V_{A1_1}$, and $V_{A1_2}$;
calculating or optimizing at least one surface of the spectacle lens taking the determined components of the power vector $P_{Ref}$ of the prescription in the visual points (x, y) into account, wherein the calculation or optimization comprises a minimization of a target function $$Z = \sum_{i=1}^{N} (K(Ref, Ast) - S(Ref, Ast))_i^2,$$

wherein:
i, i=1 ... N designates the $i^{th}$ visual point $(x, y)_i$;
K(Ref, Ast) designates the refractive error Ref and the astigmatic error Ast at the $i^{th}$ visual point of the spectacle lens; and
S(Ref, Ast) designates target values for the refractive error Ref and the astigmatic Ast at the $i^{th}$ visual point of the spectacle lens; and
manufacturing, based on the calculation or optimization, the at least one surface of spectacle lens.

2. The method according to claim 1, wherein the power vector $P_{Ref}$ is a linear function of the object distance A1:

$$P_{Ref}(x,y)=f(A1(x,y))=a+b*A1(x,y)$$

and wherein a and b are constants that are calculated as a function of the obtained prescription data $Sph_V$, $Cyl_V$, $Axis_V$ for at least two different object distances $A1_1$ and $A1_2$.

3. The method according to claim 1, wherein the power vector $P_{Ref}$ is a non-linear function of the object distance A1.

4. The method according to claim 1, wherein in a two-dimensional vector space, which is spanned by the two components $J^{Ref}_0$ and $J^{Ref}_{45}$ of the power vector $P_{Ref}$, the transition from a first point (P1) with coordinates ($J^{Ref}_0(A1_1)$, $J^{Ref}_{45}(A1_1)$) to a second point (P2) with coordinates ($J^{Ref}_0(A1_2)$, $J^{Ref}_{45}(A1_2)$) takes place along the shortest connection between the first (P1) and the second (P2) point.

5. The method according to claim 1, wherein in a three-dimensional vector space, which is spanned by the three components $M^{Ref}$, $J^{Ref}_0$ and $J^{Ref}_{45}$ of the power vector $P_{Ref}$, the transition from a first point (P1) with coordinates ($M^{Ref}(A1_1)$, $J^{Ref}_0(A1_1)$, $J^{Ref}_{45}(A1_1)$) to a second point (P2) with coordinates ($M^{Ref}(A1_2)$, $J^{Ref}_0(A1_2)$, $J^{Ref}_{45}(A1_2)$) takes place along the shortest connection between the first (P1) and the second (P2) point.

6. The method according to claim 1, comprising specifying an accommodation model for an amplitude of accommodation Akk as a function of the object distance A1, wherein it holds for the refractive error Ref and the astigmatic error Ast:

$$Ast=-2\sqrt{J^{Dif^2}_0+J^{Dif^2}_{45}},$$

$$Ref=M^{Dif}$$

wherein:

$$P_{Dif}=\begin{pmatrix} M^{Dif} \\ J^{Dif}_0 \\ J^{Dif}_{45} \end{pmatrix}=P_{BG+Akk}-P_{Ref},$$

$$P_{BG+Akk}=\begin{pmatrix} M^{BG+Akk} \\ J^{BG+Akk}_0 \\ J^{BG+Akk}_{45} \end{pmatrix},$$

$$M^{BG+Akk}=(Sph_{BG}+Akk)+\frac{Cyl_{BG}}{2}$$

$$J^{BG+Akk}_0=-\frac{Cyl_{BG}}{2}\cos 2Axis_{BG} \text{ and}$$

$$J^{BG+Akk}_{45}=-\frac{Cyl_{BG}}{2}\sin 2Axis_{BG}$$

$Sph_{BG}$, $Cyl_{BG}$, $Axis_{BG}$ respectively designate the sphere $Sph_{BG}$, astigmatism $Ast_{BG}$ and astigmatism axis $Axis_{BG}$ of a spectacle lens in the wearing position.

7. The method according to claim 6, wherein the amplitude of accommodation Akk is a linear function of the object distance A1.

8. The method according to claim 1, wherein the dependence of the object distance A1(y) on the vertical coordinate y is described by a linear function or by a double asymptote function.

9. The method according to claim 1, wherein the dependence of the object distance A1(x) on the horizontal coordinate x is described by a linear function or by a quadratic function of the distance from the lens center or the principal line.

10. The method according to claim 1, wherein the spectacle lens to be optimized is a progressive spectacle lens.

11. A computer program product adapted, when loaded and executed on a computer, to perform the method for calculating or optimizing a spectacle lens according to claim 1.

12. A storage medium with a computer program stored thereon, wherein the computer program is adapted, when loaded and executed on a computer, to perform the method for calculating or optimizing a spectacle lens according to claim 1.

13. A method for producing a spectacle lens, comprising:
calculating or optimizing a spectacle lens according to the method for calculating or optimizing a spectacle lens according to claim 1; and
manufacturing the thus calculated or optimized spectacle lens.

14. A device for producing a spectacle lens, comprising:
calculating or optimizing means adapted to calculate or optimize the spectacle lens according to a the method for calculating or optimizing a spectacle lens according to claim 1; and
processing means adapted to finish the spectacle lens.

15. The method according to claim 1, wherein the manufacturing comprises direct machining of a blank according to the calculation or optimization.

16. The method according to claim 1, wherein the manufacturing is performed according to a casting method.

17. A device for calculating or optimizing and manufacturing a spectacle lens, comprising:
prescription data obtaining means adapted to obtain prescription or refraction data $V_{A1_1}$, and $V_{A1_2}$ of a spectacles wearer for at least two different object distances $A1_1$ and $A1_2$, wherein $A1_1$ does not equal $A1_2$, and the prescription data comprises data relating to a spherical power $Sph_V$, a magnitude of the astigmatism $Cyl_V$, and an astigmatism axis $Axis_V$ for the at least two different object distances $A1_1$ and $A1_2$;
object distance model specifying means adapted to specify an object distance model A1(x, y), wherein A1 designates the object distance and (x, y) designates a visual spot or visual point of the spectacle lens in a predetermined or predeterminable direction of sight;
prescription model specifying means adapted to specify a function $P_{Ref}=f(A1)$, which describes the dependence of a power vector $$P_{Ref}=\begin{pmatrix} M^{Ref} \\ J^{Ref}_0 \\ J^{Ref}_{45} \end{pmatrix}$$

of the prescription on the object distance A1, wherein $$M^{Ref}=Sph_V+\frac{Cyl_V}{2}$$

$$J^{Ref}_0=-\frac{Cyl_V}{2}\cos 2Axis_V$$

$$J^{Ref}_{45}=-\frac{Cyl_V}{2}\sin 2Axis_V;$$

prescription determining means adapted to determine the components of the power vector $P_{Ref}$ of the prescription in a plurality of visual points (x, y) on the basis of the object distance model $A1(x, y)$ and the obtained prescription data $V_{A1_1}$, and $V_{A1_2}$;

calculating or optimizing means adapted to calculate or optimize at least one surface of the spectacle lens taking the determined components of the power vector $P_{Ref}$ of the prescription in the visual points $(x, y)$ into account, wherein the calculation or optimization comprises a minimization of a target function $$Z = \sum_{i=1}^{N} (K(Ref, Ast) - S(Ref, Ast))_i^2,$$

wherein:
- $i$, $i=1 \ldots N$ designates the $i^{th}$ visual point $(x, y)_i$;
- $K(Ref, Ast)$ designates the refractive error Ref and the astigmatic error Ast at the $i^{th}$ visual point of the spectacle lens; and
- $S(Ref, Ast)$ designates target values for the refractive error Ref and the astigmatic error Ast at the $i^{th}$ visual point of the spectacle lens; and manufacturing means adapted to manufacture, based on the calculation or optimization, the at least one surface of the spectacle lens.

* * * * *

UNITED STATES PATENT AND TRADEMARK OFFICE
CERTIFICATE OF CORRECTION

| | |
|---|---|
| PATENT NO. | : 8,915,589 B2 |
| APPLICATION NO. | : 13/639602 |
| DATED | : December 23, 2014 |
| INVENTOR(S) | : Gregor Esser et al. |

It is certified that error appears in the above-identified patent and that said Letters Patent is hereby corrected as shown below:

In the Drawings:

Fig. 2, Sheet 2 of 10 and Fig. 3, Sheet 3 of 10, please make the following corrections:

The astigmatic error distributions shown on the right hand side of each of Figures 2 and 3 of the patent are replaced with corrected astigmatic error distributions that more closely correspond to the distributions shown in the originally filed Figures 2 and 3 of PCT application PCT/EP2011/002055.

Fig. 8, Sheet 6 of 10, please make the following correction:

The missing points P1 and P2 on Figure 8 of the patent that were shown in the originally filed Figure 8 of PCT application PCT/EP2011/002055 are added.

Signed and Sealed this
Twelfth Day of January, 2016

Michelle K. Lee
*Director of the United States Patent and Trademark Office*